Jan. 16, 1968  H. PRICE  3,363,613

APPARATUS FOR RECOMBUSTING CRANKCASE VAPORS

Filed May 6, 1966

INVENTOR.

HENRY PRICE

BY

ATTORNEYS

3,363,613
APPARATUS FOR RECOMBUSTING CRANKCASE VAPORS
Henry Price, Denver, Colo., assignor of one-half to Fred Miyamoto, Commerce City, Colo.
Filed May 6, 1966, Ser. No. 548,175
6 Claims. (Cl. 123—119)

This invention relates to anti-smog apparatus for internal combustion engines and, more specifically, to a device for recombusting the raw hydrocarbon emissions from an automobile crankcase.

Automobile and truck exhaust has become the major contribution to the smog and air pollution problem. Smog has been accredited with chronic respiratory ills, heart disease and possibly cancer causing agents. The most harmful of smog pollutants are created when raw hydrocarbons combine with nitrogen oxides in the presence of sunlight. The above substances, along with carbon monoxide, are spewed into the atmosphere by automobiles at the rate of a trillion cubic feet a day, producing two to three times the amount of smog producing hydrocarbons and nitrogen oxides produced by all other sources of air pollution combined. These automobile emissions come from two sources, the first being the exhaust and the second the crankcase ventilation. Contrary to earlier estimates, the pollutants escaping from the crankcase alone have been rated as high as 50% of the total.

Various methods have been developed in the prior art for treating exhaust pollutants which basically fall into the following two types: catalytic converters or afterburners. A converter is essentially a muffler stuffed with rare metals in powdered or pellet form acting as a catalytic chemical which converts the hydrocarbons to harmless $CO_2$ and water. An afterburner is a small furnace substituted for the muffler that reburns the exhaust gases as they pass therethrough. This complete combustion eliminates carbon monoxide and the reburned fuels. Devices of either type are quite expensive to install and maintain and, for this reason, various automobile manufacturers and state governing agencies have been hesitant to fully endorse such devices. Other lines of thinking have attacked the problem of exhaust pollutants by attempting to produce a more complete or efficient burning of the fuel in the engine.

The remaining offending automobile gases, which can amount to as high as 50%, are escaping from the engine crankcase, not from the exhaust pipe. The present invention is directed to only those pollutants emitted from the engine crankcase. Basically, the present invention involves feeding the crankcase vapors back through the intake system for burning along with the gasoline. There have been various variations of the basic principle which have had numerous advantages and disadvantages. It has been attempted to vent the crankcase fumes directly into the intake manifold, but such a method inhibits the necessary vacuum which draws the raw gasoline into the combustion chambers. Other types have vented only the valve covers which only include a portion of the crankcase vapors. Most of the new automobiles presently being sold are equipped with varied types of crankcase vapor recycling apparatus.

The present invention, for the most part, is directed mainly to those older automobiles which do not have any such recycling apparatus. An older automobile whose engine is not operating in an efficient manner is producing approximately four times (4000 parts-per-million of hydrocarbons) the amount of pollutants as does a new car. This excessive amount of pollutants has caused certain state governments to pass legislation requiring that all used cars sold must be equipped with some type of smog-reduction gear. The device of the present invention which attaches to the air filter is readily adjustable to fit any type of automobile without any structural changes The air filter adapter can be mounted or removed in a matter of minutes with a minimum of effort.

It is, therefore, the principal object of the present invention to provide a novel and improved anti-smog device which recombusts crankcase vapors in automobiles and truck engines.

A second objective is to provide a versatile anti-smog device which is readily adaptable to fit various types of automobile engines.

Another objective is to provide an anti-smog device which recombusts crankcase vapors without affecting the carburetion of the engine.

Still another object of the present invention is to provide an anti-smog device which is readily installed or removed from an automobile engine without any modifications thereof.

An additional object of the present invention is to provide an anti-smog device which is exceedingly simple in construction and inexpensive, rugged and trouble free in operation.

Other objects will be in part apparent and in part pointed out specifically hereinafter in connection with the description of the drawings that follow and in which.

Figure 1:
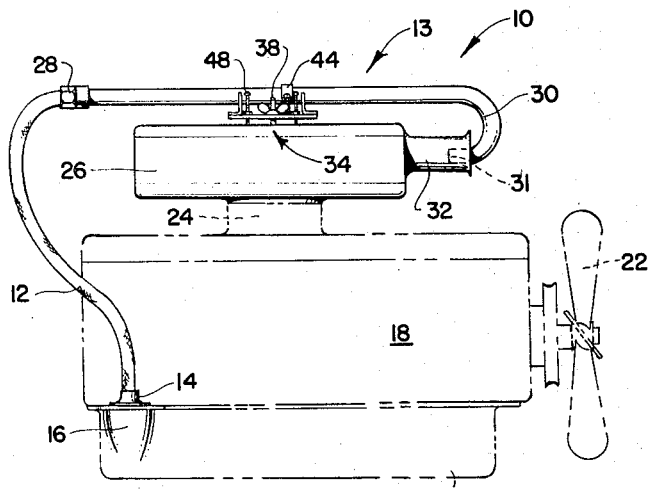
FIGURE 1 is a side elevational view of the crankcase vapor adapter and connected hose mounted on an automobile engine shown partially in dotted line.
Figure 2:
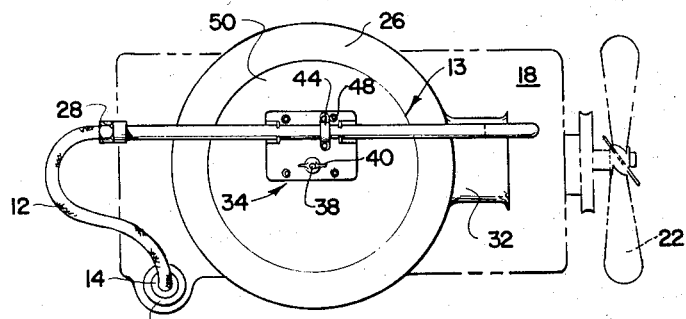
FIGURE 2 is a top plan view of the adapter positioned relative to the engine air filter.

Referring now to the drawings for a detailed description of the present invention and, initially, to FIGURE 1 for this purpose, it will be seen that the anti-smog device has been designated in its entirety by reference numeral 10. The device essentially feeds the vented crankcase vapors back through the intake system of the engine. The device 10 includes a flexible tube or hose 12 and adapter 13 which, by reason of connector 14, are attached to the crankcase air vent 16. In all automobile engines, there is a crankcase air vent to which connector 14 can be attached. The hose 12 is flexible by reason of the fact that in various engines, the crankcase vent is located in different positions. The automobile engine 18 is shown in dotted line for purposes of reference, having a crankcase portion 20 and a fan 22. Since the engine itself is not a part of the present invention, it is not shown in detail. Positioned in stacked relation on top of the engine is first the carburetor 24 and then the air filter 26. The essential part of the device 10 is the rigid adapter tube 13 which is releasably mounted on the air filter 26. At one end of the adapter 13 is a common type fitting 28, which connects the adapter to the flexible hose 12. The opposite end of the adapter is curved in a U shaped portion 30 so that the end 31 of the adapter tube 13 will enter the air intake 32 of the air filter 26. The end 31 of the adapter tube 13 is sufficiently small so as not to restrict the air flow into the air intake 32. When the engine is in operation, the vacuum produced therein draws air through the intake 32. Because of the close proximity of the end 31 of the adapter tube, the fumes from the crankcase are drawn into the engine through the carburetor 24.

The adapter tube 13 is held in place by an adjustable mounting plate 34. The plate 34 having an opening 36 is positioned on the top of the air filter 26 with the center bolt 38 passing through the opening 36. The common air filter wing nut 40 is screwed into position, thus holding plate 34 in integral relation with the air filter 26. Both the mounting bolt 38 and wing nut 40 are common to air filters of this type. The adapter tube 13 is positioned in a pair of saddle shaped members 42 attached to the plate 34.

Figure 3:
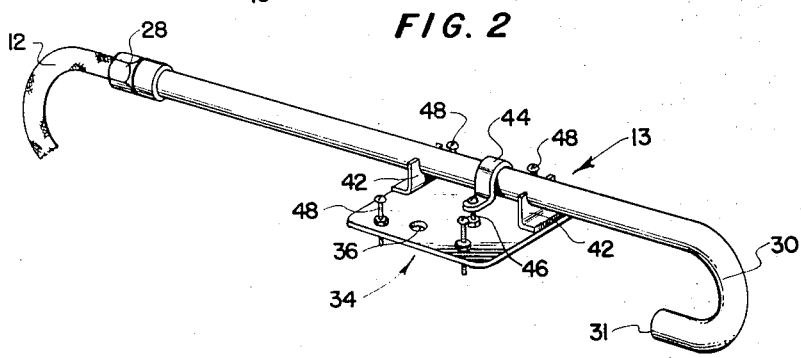
FIGURE 3 is a perspective view to an enlarged scale of said adapter.

The tube 13 is secured to the plate 34 by a U shaped strap 44 and a pair of mounting bolts 46 as best seen in FIGURE 3.

By reason of the various sizes and shapes of air filters in different automobiles, the plate 34 has various adjustable features. The tie strap 44 can be released so that the tube 13 can slide freely through the mounting plate 34 to accommodate various diameter air filters. Positioned at the four corners of the mounting plate 34 are a series of adjustable set screws 48. The set screws can be raised or lowered to align the end 31 of the adapter tube with the air intake opening 32. Some air filters have a more pronounced recess 50 than others, necessitating such an adjustment. The recessed portion 50 is not always flat so the set screws in some situations must be adjusted individually to keep the plate 34 in a horizontal position.

The overall device 10 can be readily mounted in close by removing the wing nut 40 from the air filter and attaching the flexible hose 12 to the crankcase air vent 16 without any modifiaction to the engine. The device can also be removed in a similar manner.

Having thus described the several useful and novel features incorporated in the apparatus for recombusting crankcase vapors of the present invention, it will be seen that the many worthwhile objectives for which it was designed have been achieved. Although but a single specific embodiment of the apparatus has been illustrated and described herein, we realize that certain changes may well occur to those skilled in the art within the broad teaching thereof; hence, it is our intention that the scope of protection afforded hereby shall be limited only insofar as said limitations are expressly set forth in the appended claims.

What is claimed is:

1. An anti-smog device for recombusting crankcase vapors through the air intake system of an internal combustion engine having a combustion air filter which comprises: a rigid conduit means having an inlet end and an outlet end, the inlet end being adapted to connect to the crankcase air vent for conveying the crankcase vapors therethrough, the outlet end being positioned approximate the air filter inlet opening so that said vapors will be drawn into the engine air intake, releasable mounting means for attaching the conduit means to the mounting bolt of the air filter.

2. An anti-smog device as set forth in claim 1 in which the conduit means includes a flexible portion attached to the inlet end, the outlet end of the conduit means having a U shaped bend therein for insertion into the air filter inlet opening.

3. An anti-smog device as set forth in claim 1 wherein the mounting means is adapted to fasten to the center bolt of the air filter, the mounting means further includes a first adjustment means for regulating the height of the conduit means above the air filter inlet opening.

4. An anti-smog device as set forth in claim 1 wherein the mounting means includes a fastening means for releasably attaching the mounting means to the center bolt of the air filter, the mounting means including a first adjustment means for regulating the height of the conduit means above the air filter inlet opening, and a second adjustment means which releasably attaches the conduit means to the mounting means at any longitudinal position on said conduit means.

5. An anti-smog device as set forth in claim 1 wherein the mounting means comprises a base member having an opening therein for engagement by the center bolt of the air filter, a plurality of set screws threadably engaging said base and extending normally thereof for regulating the height of the base above the air filter, a pair of saddle members attached to said base for supporting said conduit means, a securing means for releasably holding said conduit means in said saddle members and allowing said conduit means to slide longitudinally therethrough.

6. An anti-smog device as set forth in claim 1 wherein the mounting means for releasably attaching the mounting means to the center bolt of the air filter, the mounting means includes a first adjustment means for regulating the height of the conduit means above the air filter inlet opening, the conduit means including a flexible portion attached to the inlet end of the conduit means, an adapter member positioned at the outlet end of said conduit means having an extended longitudinal conduit portion with one end attached to said flexible portion, the opposite end of said adapter having a U shaped 180 degree bend relative to said longitudinal portion.

References Cited

UNITED STATES PATENTS

| | | | |
|---|---|---|---|
| 3,161,187 | 12/1964 | Parker | 123—119 |
| 3,179,095 | 4/1965 | Linn | 123—119 |
| 3,313,281 | 4/1967 | Schneider | 123—119 |

AL LAWRENCE SMITH, *Primary Examiner.*